United States Patent [19]
Wallett

[11] 3,758,232
[45] Sept. 11, 1973

[54] BLADE ASSEMBLY FOR GAS TURBINE ENGINES

[75] Inventor: John Stanley Wallett, Allestree, England

[73] Assignee: The Secretary of State for Defence, London, England

[22] Filed: Apr. 23, 1971

[21] Appl. No.: 136,705

Related U.S. Application Data

[62] Division of Ser. No. 794,138, Jan. 27, 1969, Pat. No. 3,616,508.

[52] U.S. Cl. .................................. 416/213, 416/230
[51] Int. Cl. .............................................. F01d 5/34
[58] Field of Search .................... 416/229, 230, 212, 416/213, 214, 215

[56] References Cited
UNITED STATES PATENTS

| 2,989,285 | 6/1961 | Warnken | 416/214 X |
| 3,501,090 | 3/1970 | Stoffer et al. | 416/230 X |
| 3,532,438 | 10/1970 | Palfreyman et al. | 416/213 |
| 3,616,508 | 11/1971 | Wallett | 416/213 X |
| 3,549,444 | 12/1970 | Katz | 416/230 UX |

FOREIGN PATENTS OR APPLICATIONS

| 969,413 | 5/1950 | France | 416/212 |
| 1,040,697 | 5/1953 | France | 416/218 |
| 1,121,516 | 5/1956 | France | 416/212 |
| 455,596 | 3/1950 | Italy | 416/212 |

Primary Examiner—Everette A. Powell, Jr.
Attorney—Cushman, Darby & Cushman

[57] ABSTRACT

A blade assembly for a gas turbine engine comprising an annulus of blades in which a blade row is formed from an annular array of pieces, each comprising a blade flank, an interconnecting portion, and an opposing flank of an adjacent blade. The pieces are made from fiber reinforced material and filament winding techniques are utilized in making the individual pieces. The blade assembly may be used for compressor or turbine rotors or stators.

4 Claims, 5 Drawing Figures

PATENTED SEP 11 1973 3,758,232
SHEET 1 OF 2
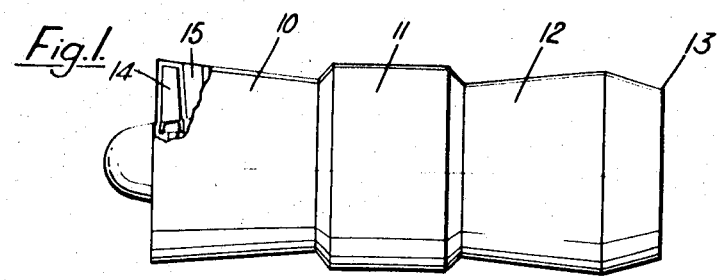
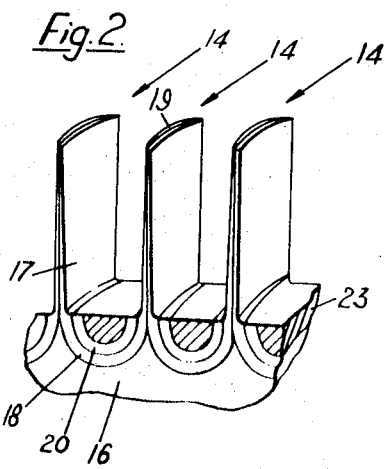 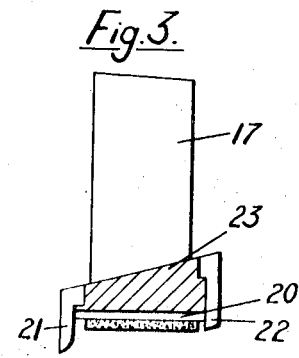
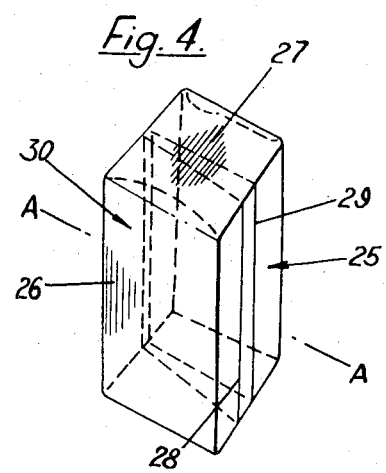
Inventor
J. S. WALLETT
By
Cushman, Darby & Cushman
Attorneys

BLADE ASSEMBLY FOR GAS TURBINE ENGINES

This application is a Division of my co-pending application Ser. No. 794,138 filed Jan. 27, 1969 now U. S. Pat. No. 3,616,508 issued Nov. 2, 1971.

This invention relates to an improved blade assembly for a gas turbine engine, the blade assembly be-ing capable of use as a rotor or stator.

BRIEF SUMMARY OF THE INVENTION

There has recently been considerable interest in the use of composite materials, particularly fibre re-inforced materials, for the manufacture of blades for gas turbine engines. The present invention provides an annulus of blades made from a plurality of fibre reinforced pieces which uses the high tensile strength of the fibre re-inforcement in an advantageous fashion.

According to the present invention, the blade assembly for a gas turbine engine comprises a plurality of pieces of fibre re-inforced material, each piece comprising one aerodynamic flank of a portion of a blade, an interconnecting portion, and an opposing aerodynamic flank of a portion of an adjacent blade; and means fastening the pieces together in annular array so that each blade flank of one piece abuts an opposing blade flank on an adjacent piece to form the completed blade assembly. Preferably the individual pieces are so formed that the majority of the fibre re-inforcement in the blade flanks is aligned in a direction which is substantially radial with respect to the assembled annular array forming the composite blade assembly.

When the pieces are assembled the interconnecting portion may be held on a blade disc by an axially extending beam piece which passes across and radially outside the interconnecting portion. The beam pieces may be held by an axial nip between a pair of lipped disc portions.

In an alternative construction each piece comprises a box section member in which opposing faces form the flank section while the remaining faces form inner and outer shroud members. In this case the portions may be joined by adhering the flank portions together to form a complete annulus which may be joined to a disc.

In the latter case the portions are preferably formed by filament winding around a former whose external shape corresponds to the inter-blade shape required.

The invention will be particularly described merely by way of example with reference to the accompanying drawings in which:

BRIEF DESCRIPTION OF THE DRAWINGS

FIG. 1 is a side elevation, partly broken away, of a gas turbine engine incorporating blades in accordance with the present invention.

FIG. 2 is a perspective view showing one embodiment of blades according to the present invention mounted on a disc.

FIG. 3 is a radial section in between two blades of the embodiment of FIG. 2.

FIG. 4 is a perspective view of a further embodiment of the invention.

DETAILED DESCRIPTION OF THE INVENTION

Figure 5:
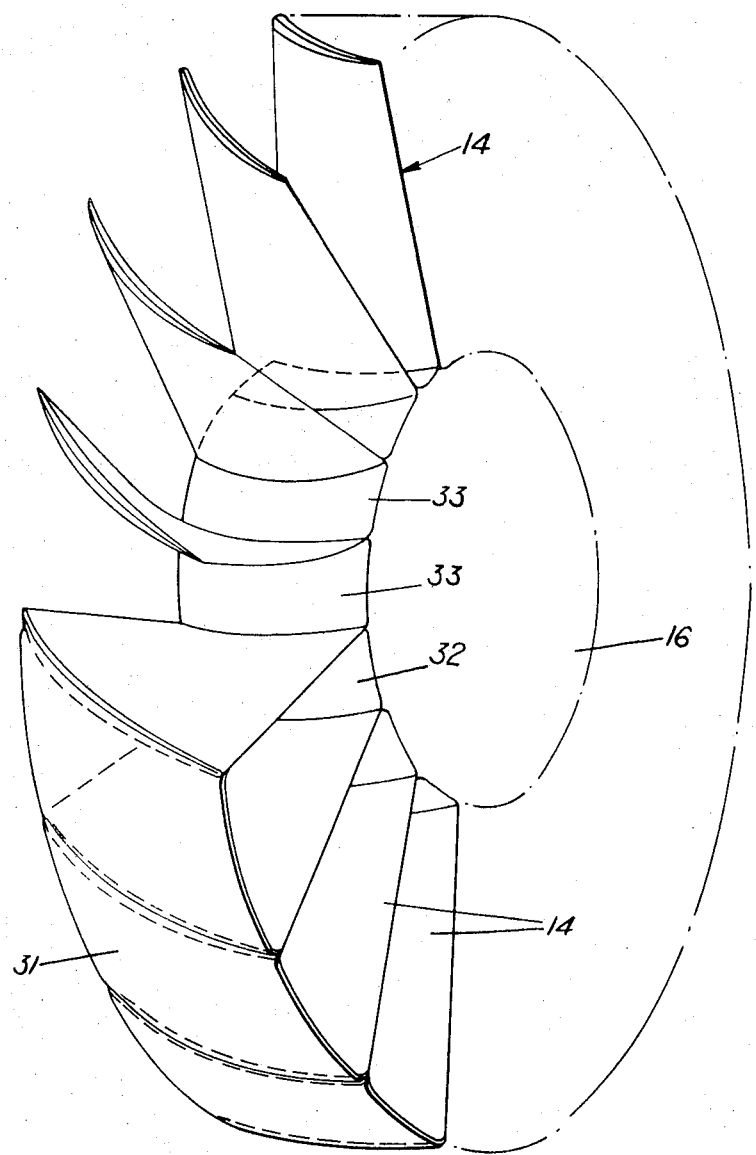
FIG. 5 is a perspective view of a disc incorporating the blades of FIG. 4.

In FIG. 1 there is shown a gas turbine engine comprising a compressor 10, combustion equipment 11, turbine 12 and a final nozzle 13. The casing of the compressor 10 is broken away at its left hand extremity to show compressor rotor blades 14 and stator blades 15.

FIG. 2 shows in perspective the compressor blades 14 together with their mounting arrangements on a compressor disc, part of which is shown at 16. The blades 14 are made up from a series of U-shaped pieces, each being formed from a fibre re-inforced resin material and comprising an aerodynamic flank portion 17 of concave transverse section a U-shaped interconnecting portion 18 and an aerodynamic flank portion 19 of convex transverse section. It will be seen that the pieces are of generally U-shaped overall, the limbs of the U-shape forming the aerodynamic flank portions 17 and 19 while the remainder forms the interconnecting portion 18. Each portion 17 is glued to the portion 19 of the next adjacent piece so as to form a complete blade 14, and it will be appreciated that the U-shaped pieces together form a complete annular array of blades 14.

Each of the U-shaped pieces is held in position on the disc 16 by virtue of the engagement of a half cylindrical beam member 20 with the interconnecting portion 18. As can be seen best in FIG. 3 the beam member 20 extends axially in between two retaining disc projecting portions 21 and 22. It will be evident that the blades are thus held against centrifugal loads by tensile stresses in the portion 18 which are transferred to the beam 20 and hence to the disc 16, while bending moments may be reacted into the beam portions 20 by glueing the portions 20 to the portions 18. If required the interconnecting portions 18 may also be glued to the main disc 16 so as to provide further strength against bending.

In order to smooth the root shroud portion of the blades 14 the central channel in each of the beam portions 20 is filled as shown at 23 by a lightweight foamed plastic filler which provides a smooth external surface.

In each of the U-shaped portions made up of the flanks 17 and 19 and the interconnecting portion 18 the fibre re-inforcements are arranged to run radially of the disc 16 in the flanks 17 and 19 and to follow the line of the interconnecting portion 18 so that they are substantially circumferentially disposed in this portion. It will be appreciated that using this construction the fibres are arranged to be under tension by virtue of the centrifugal loads on the blades; since it is in tension in which these re-inforcement fibres, which may for instance be carbon or graphite fibres, are strongest it will be appreciated that this method is an advantageous way of making and mounting blades. The fibres referred to in the above example may conveniently be laid up to form the U-shaped pieces as continuous filaments in a filament winding technique.

FIG. 4 shows in perspective a further way of manufacturing blades according to the present invention. A former 25 is provided part of whose surfaces are formed to be in the shape of the space required in between two blades 14, and coated with a parting agent if necessary. Around these surfaces re-inforcing fibre in the form of a continuous filament having a coating of resin which is allowed to become "tacky" is wound as indicated at 26 and 27. The winding may conveniently be effected by rotating the former about a central axis (indicated at A-A) while feeding the filament into the correct position. It is necessary that the filament be "tacky" to enable the filament to remain in place on surface areas of high slope. Once the filament has been wound around these surfaces, it is further impregnated with resin and the whole is heated to cure the resin. The former 25 is split as shown at 28 and 29 into three pieces, one of which is wedge shaped and can easily be withdrawn from inside the cured member 30.

It will therefore be appreciated that this wedge shaped portion can be removed and leaves space for the remaining portions of the former 25 to be removed; leaving the portion 30. The portion 30 thus takes the form of a hollow box open at opposed faces and having an inner shape which is the required shape of the inter blade spacing. The portion which was against the wall 26 becomes a convex flank (equivalent to 19) and the opposing surface is equivalent to the concave flank 17. The portion adjacent the surface 27 and the portion adjacent the opposite surface may then be used as inner and outer shrouds or may be cut off if necessary.

FIG. 5 is a perspective view of a disc 16 from which are mounted a plurality of blades 14 and which indicates how the box section members 30 are used to form an annulus of blades. In the lower portion of FIG. 5 the blades 14 are made up of box sections 30 as shown in FIG. 4 and it will be noted that each box section abuts against an adjacent box section so that the two flank portions abut to form a single hollow blade 14. In this case the outer shroud portions have been left in position and form a continuous outer shroud as indicated at 31. The inner shroud portions of the box sections are connected to the disc 16 at 32 by means of a resin bonding technique.

It will be appreciated that were it required to manufacture a row of stator blades, then it would be unnecessary to stick the box sections at 32; instead it might be required for instance to stick the portions 31 to a casing of the engine.

The upper part of FIG. 5 shows a slightly different way of using the box sections 30. In this case the outer shroud portions have been cut off, leaving the portions having a rectangular U-shape. These portions may be used in a similar fashion to those shown in FIG. 2; as an alternative they may be simply glued to the disc 16 as shown at 33. Again it would be appreciated that the fibres forming the blade 14 are in tension when centrifugal loading is present, this being the strongest direction of the fibre re-inforcement.

Although this is not illustrated it would of course be possible to cut away the inner shroud portions of the box section members 30; this might be necessary where it is proposed to manufacture the stator blades having no shroud at their inner peripheries, and in this case the outer shroud portions 31 would probably be glued to a casing of the engine.

In the above instances carbon fibre re-inforced resin materials have been used. It will be appreciated that it is possible to use alternative fibre systems; thus carbon fibres could be used in other matrix materials such as nickel matrix which would be useful where high temperatures are to be experienced; alternatively different fibre materials such as boron or silica can be used in matrix materials such as aluminum.

It will also be appreciated that although the embodiments illustrated provide a complete flank on each of the limbs of the U-section, it would be possible to provide merely a portion of the flank on one limb, the remainder of this flank being provided on the abutting limb of the next adjacent portion.

The above embodiments comprise hollow blades; the technique of the present invention can thus be seen to enable the production of hollow blades relatively easily. The advantages of hollow blades are of course well know.

What is claimed is:

1. A blade assembly of a plurality of blades for a gas turbine engine, said blade assembly comprising: a plurality of individual blade pieces, each of said blade pieces being separately formed into an integral structural unit, each of said blade pieces being fiber reinforced and including a first aerodynamic flank portion of one blade of the assembly, a second aerodynamic flank portion of an adjacent blade of the assembly and opposing said first aerodynamic portion, and at least one interconnecting portion common to said first and second flank portions of an individual piece, means to which the interconnecting portions of said fiber reinforced blade pieces are connected to form an annulus of blades of the blade assembly with the first aerodynamic flank portion of one blade piece being secured in contiguous abutting relationship with the second aerodynamic flank portion of the next adjacent blade piece to form a complete composite blade of said plurality of blades.

2. A blade assembly as claimed in claim 1 in which said interconnecting portion defines a blade root portion and in which said means includes a disc having a plurality of root receiving means on its periphery, said blade disc having projections thereon and beam pieces engaging said projections, said beam pieces extending across the radially outside of said interconnecting portions of said pieces, said beam pieces retaining said first mentioned pieces to said disc.

3. A blade assembly as claimed in claim 2 including a pair of circumferential rims defining said projections, said beam pieces being held against the radially inner surfaces of said rims.

4. A blade assembly as claimed in claim 1 in which said reinforced fiber blade pieces are secured to said root receiving means of said disk by gluing.

* * * * *